(12) United States Patent
Xiao et al.

(10) Patent No.: US 11,569,579 B2
(45) Date of Patent: Jan. 31, 2023

(54) WIRELESS DATA TRANSMISSION USING POLARISED ELECTROMAGNETIC RADIATION

(71) Applicant: University of Surrey, Guildford (GB)

(72) Inventors: Pei Xiao, Guildford (GB); Timothy Brown, Guildford (GB); James Kelly, Guildford (GB); Yasin Kabiri Isfahani, Guildford (GB); Rahim Tafazolli, Guildford (GB)

(73) Assignee: University of Surrey, Surrey (GB)

( * ) Notice: Subject to any disclaimer, the term of this patent is extended or adjusted under 35 U.S.C. 154(b) by 73 days.

(21) Appl. No.: 17/262,939

(22) PCT Filed: Jul. 25, 2019

(86) PCT No.: PCT/GB2019/052092
§ 371 (c)(1),
(2) Date: Jan. 25, 2021

(87) PCT Pub. No.: WO2020/021274
PCT Pub. Date: Jan. 30, 2020

(65) Prior Publication Data
US 2021/0167508 A1      Jun. 3, 2021

(30) Foreign Application Priority Data

Jul. 25, 2018 (GB) ..................... 1812108

(51) Int. Cl.
*H01Q 3/00* (2006.01)
*H04B 7/10* (2017.01)
(Continued)

(52) U.S. Cl.
CPC ............ *H01Q 9/0435* (2013.01); *H01Q 3/04* (2013.01)

(58) Field of Classification Search
CPC .. H01Q 3/04; H01Q 1/38; H01Q 3/02; H01Q 3/00; H01Q 9/0435; H01Q 9/04;
(Continued)

(56) References Cited

U.S. PATENT DOCUMENTS

| 4,310,813 A * | 1/1982 | Yuuki | H04B 7/002 455/60 |
| 4,740,790 A * | 4/1988 | Hess, Jr. | G01R 23/16 342/361 |

(Continued)

FOREIGN PATENT DOCUMENTS

| CN | 111293426 A * | 6/2020 | ............... H01Q 1/36 |
| CN | 113839216 A * | 12/2021 | |

*Primary Examiner* — Tho G Phan
(74) *Attorney, Agent, or Firm* — Umberg Zipser LLP; Ryan Dean

(57) ABSTRACT

A wireless data transmission apparatus is disclosed, comprising one or more antennas for transmitting data as polarised electromagnetic radiation, and polarisation control means for controlling an axial ratio and a tilt angle of the polarised electromagnetic radiation such that the axial ratio and tilt angle conveys information about the data being transmitted. A corresponding wireless data receiving apparatus is also disclosed. In some embodiments, the one or more antennas comprises a patch antenna, and the polarisation means may comprise a mechanism for varying an electrical length of the angled slot. By utilising the tilt angle and axial ratio of polarised electromagnetic radiation to convey information to the receiver, the spectral efficiency of the system can be increased. A further increase in spectral efficiency may be obtained by using the polarisation control means to modulate first and second carrier waves, and transmitting different data on the first and second carrier waves.

17 Claims, 8 Drawing Sheets

(51) Int. Cl.
*H01Q 9/04* (2006.01)
*H01Q 3/04* (2006.01)

(58) Field of Classification Search
CPC .... H04B 7/02; H04B 7/10; H04L 5/00; H04L 5/0026
See application file for complete search history.

(56) References Cited

U.S. PATENT DOCUMENTS

| | | | | |
|---|---|---|---|---|
| 5,592,177 | A * | 1/1997 | Barrett | H01Q 21/245 342/361 |
| 6,002,370 | A * | 12/1999 | Mckinnon | H01Q 1/38 343/876 |
| 8,269,668 | B2 * | 9/2012 | Barker | H01Q 1/246 342/372 |
| 11,139,569 | B2 * | 10/2021 | Tidhar | H01Q 3/267 |

* cited by examiner

WIRELESS DATA TRANSMISSION USING POLARISED ELECTROMAGNETIC RADIATION

TECHNICAL FIELD

The present invention relates to wireless data transmission. More particularly, the present invention relates to wireless data transmission using polarised electromagnetic radiation.

BACKGROUND

Wireless data transmission systems are coming under increasing pressure due to the ever-growing numbers of mobile users and the amount of mobile traffic, both of which are increasing at a staggering rate. The volume of global mobile data traffic is predicted to increase by a factor of 103 over the next decade. In the microwave frequency bands in particular, which are used for mobile wireless communication services, spectrum scarcity is a major concern for the deployment of new wireless networks. There is therefore a need for the next generation of wireless data transmission systems to offer higher spectrum efficiencies than existing systems, to support the ever-increasing demand for capacity.

The invention is made in this context.

SUMMARY OF THE INVENTION

According to a first aspect of the present invention, there is provided a wireless data transmission apparatus comprising: one or more antennas for transmitting data as polarised electromagnetic radiation; and polarisation control means for controlling an axial ratio and a tilt angle of the polarised electromagnetic radiation such that the axial ratio and tilt angle conveys information about the data being transmitted.

In some embodiments according to the first aspect, the polarisation control means is configured to apply in-phase I and quadrature Q modulation in addition to controlling the axial ratio and tilt angle of the polarised electromagnetic radiation.

In some embodiments according to the first aspect, the polarisation control means is configured to apply the I and Q modulation and control the axial ratio and tilt angle according to a constellation mapping scheme comprising a plurality of symbols, wherein each one of the plurality of symbols is defined by a different combination of the axial ratio, tilt angle and I and Q values.

In some embodiments according to the first aspect, the polarisation control means is configured to modulate first and second carrier waves, and the one or more antennas are configured to transmit the first modulated carrier wave as electromagnetic radiation having a first polarisation direction and to transmit the second modulated carrier wave as electromagnetic radiation having a second polarisation direction orthogonal to the first polarisation direction.

In some embodiments according to the first aspect, the polarisation control means is configured to modulate the first and second carrier waves with the same data.

In some embodiments according to the first aspect, the data to be transmitted comprises first data and second data, the second data being different to the first data, and wherein the polarisation control means is configured to modulate the first carrier wave with the first data and to modulate the second carrier wave with the second data.

In some embodiments according to the first aspect, the one or more antennas comprises a patch antenna.

In some embodiments according to the first aspect, the patch antenna comprises an angled slot for generating polarised electromagnetic radiation.

In some embodiments according to the first aspect, the polarisation control means comprises: means for varying an electrical length of the angled slot; and a polarisation controller configured to control said means for varying the electrical length of the angled slot so as to control the axial ratio and tilt angle.

In some embodiments according to the first aspect, the means for varying the electrical length of the angled slot comprises a variable capacitor disposed at or near one end of the angled slot.

In some embodiments according to the first aspect, the patch antenna comprises first and second antenna feeds arranged to generate polarised electromagnetic radiation, and the polarisation control means is configured to vary a power and/or phase of a first input signal provided to the first antenna feed, relative to a power and/or phase of a second input signal provided to the second antenna feed.

In some embodiments according to the first aspect, the polarisation control means is configured to control the polarisation of the electromagnetic radiation on three orthogonal polarisation axes.

In some embodiments according to the first aspect, the one or more antennas comprises a plurality of antennas arranged at different orientations such that each one of the plurality of antennas is arranged to generate polarised electromagnetic radiation having a different tilt angle, the polarisation control means comprising a switching unit configured to control the axial ratio by switching an antenna input signal between the plurality of antennas.

According to a second aspect of the present invention, there is provided a wireless data receiving apparatus comprising: one or more antennas for receiving polarised electromagnetic radiation; means for determining an axial ratio and tilt angle of the received polarised electromagnetic radiation; and a data receiver configured to determine received data based on the determined axial ratio and tilt angle of the received polarised electromagnetic radiation.

In some embodiments according to the second aspect, the wireless data receiving apparatus further comprises an antenna rotation mechanism configured to electrically or physically rotate the one or more antennas, wherein the means for determining the axial ratio and tilt angle of the received polarised electromagnetic radiation is configured to monitor a power level of a signal received by the one or more antennas while the one or more antennas are rotated by the antenna rotation mechanism, and determine the axial ratio based on a difference between a minimum power level and a maximum power level detected while the one or more antennas are rotated.

In some embodiments according to the second aspect, the one or more antennas comprise a linear antenna, and the antenna rotation mechanism comprises means for physically rotating the linear antenna.

In some embodiments according to the second aspect, the one or more antennas comprise a patch antenna comprising first and second antenna feeds, and the antenna rotation mechanism comprises means for applying a phase and/or amplitude shift to a signal received from one of the first and second antenna feeds relative to a signal received from the other one of the first and second antenna feeds, to electrically rotate the patch antenna.

In some embodiments according to the second aspect, the one or more antennas comprise a plurality of linear antennas orientated at different angles, and the means for determining the axial ratio and tilt angle of the received polarised electromagnetic radiation is configured to determine the axial ratio and tilt angle by comparing power levels of a plurality of signals detected by respective ones of the plurality of linear antennas.

According to a third aspect of the present invention, there is provided a wireless data transmission system comprising the wireless data transmission apparatus according to the first aspect and the wireless data receiving apparatus according to the second aspect, wherein the wireless data receiving apparatus is arranged to receive the polarised electromagnetic radiation transmitted by the wireless data transmission apparatus.

BRIEF DESCRIPTION OF THE DRAWINGS

Embodiments of the present invention will now be described, by way of example only, with reference to the accompanying drawings, in which.

DETAILED DESCRIPTION

Figure 1:
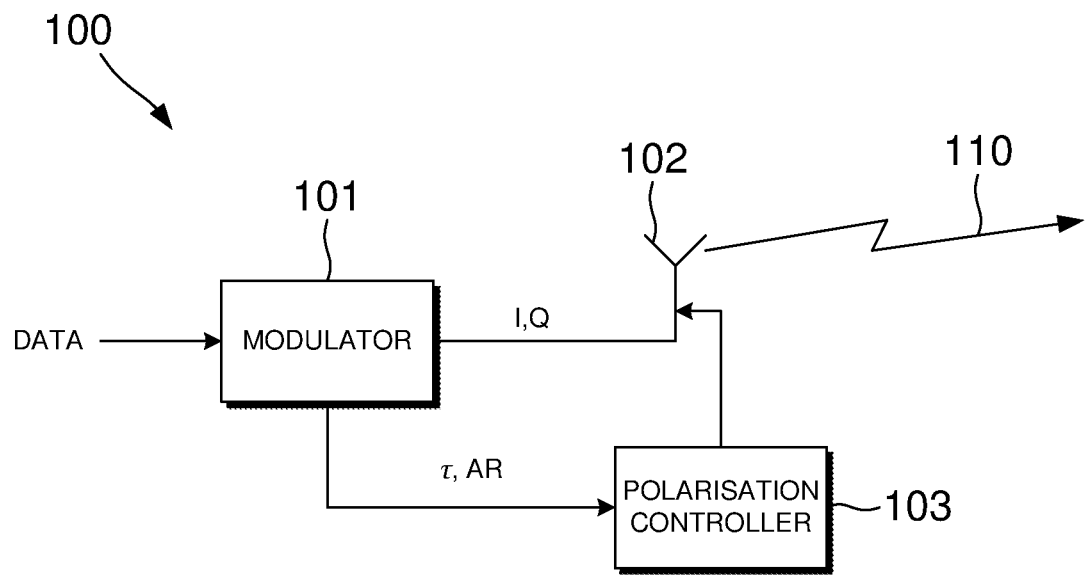
FIG. 1 illustrates a wireless data transmission apparatus, according to an embodiment of the present invention.

In the following detailed description, only certain exemplary embodiments of the present invention have been shown and described, simply by way of illustration. As those skilled in the art would realise, the described embodiments may be modified in various different ways, all without departing from the scope of the present invention. Accordingly, the drawings and description are to be regarded as illustrative in nature and not restrictive. Like reference numerals designate like elements throughout the specification.

Referring now to FIG. 1, a wireless data transmission apparatus is illustrated according to an embodiment of the present invention. The wireless data transmission apparatus 100 comprises one or more antennas 102 for transmitting data as polarised electromagnetic radiation, and polarisation control means 103 for controlling an axial ratio (AR) and a tilt angle (τ) of the polarised electromagnetic radiation 110. The polarisation control means 103 is configured to control the axial ratio and tilt angle in dependence on the data being transmitted, such that the axial ratio and tilt angle conveys information about the data to a receiver. In this way, the axial ratio and tilt angle provide additional degrees of freedom that can be used to convey information in a wireless data communication system, thereby increasing the data capacity of the wireless signal and accordingly increasing the overall spectrum efficiency of the system. For example, one combination of certain axial ratio and tilt angle values may be used to represent one data symbol, while a different combination of axial ratio and tilt angle values may be used to represent a different data symbol.

In some embodiments the axial ratio and tilt angle can be controlled in addition to applying other modulation to the polarised electromagnetic radiation 11o. In the present embodiment, the apparatus 100 is configured to apply in-phase (I) and quadrature (Q) modulation in addition to controlling the axial ratio and tilt angle of the polarised electromagnetic radiation 11o. Accordingly, in the present embodiment the apparatus 100 comprises a modulator 101 configured to modulate a carrier wave with the data to be transmitted, and to send the modulated carrier wave to the one or more antennas 102 for transmission as polarised electromagnetic radiation 11o. However, in other embodiments information may only be conveyed to the receiver using the axial ratio and tilt angle, without applying other modulation.

In the present embodiment, the modulator 101 is configured to use the polarisation controller 103 to vary the axial ratio and tilt angle of the polarised electromagnetic radiation in dependence on the input data. The polarisation controller 103 is configured to control the antenna so as to change the axial ratio and tilt angle. For example, the modulator 101 can be configured to apply the I and Q modulation and use the polarisation controller 103 to control the axial ratio and tilt angle according to a constellation mapping scheme comprising a plurality of symbols, wherein each one of the plurality of symbols is defined by a different combination of the axial ratio, tilt angle and I and Q values. The modulator 101 and the polarisation controller 103 may collectively be referred to as the polarisation control means.

Figure 2:
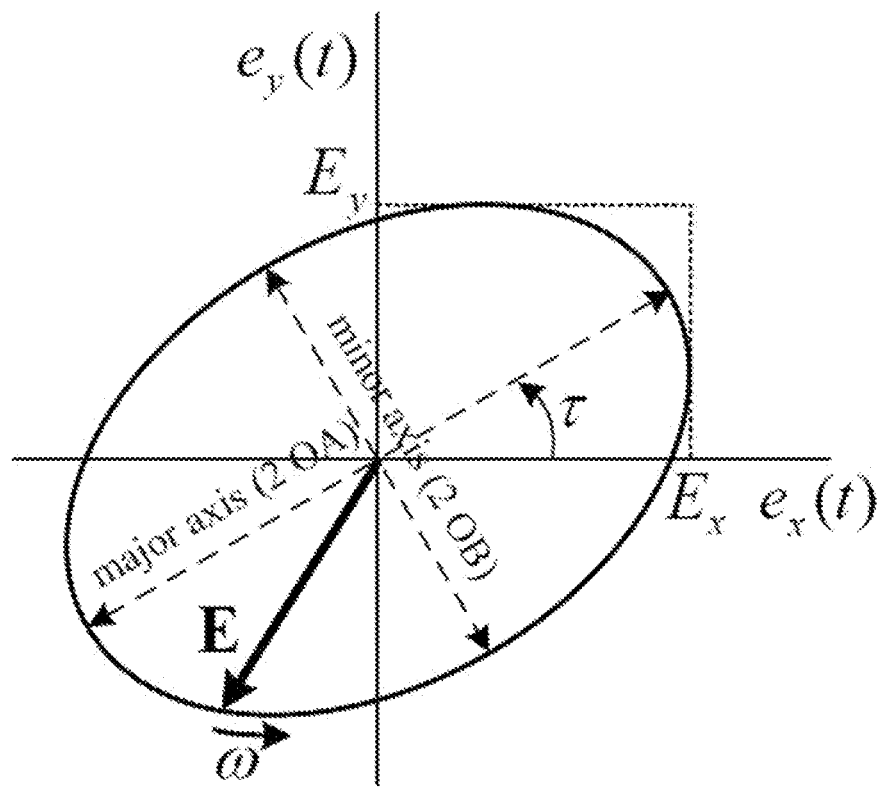
FIG. 2 illustrates parameters defining a polarisation ellipse for polarised electromagnetic radiation, according to an embodiment of the present invention.

The polarisation ellipse can be described by a plurality of parameters including the major axis (2OA), minor axis (2OB), AR and τ, as shown in FIG. 2. The parameters OA, OB, AR and τ may be defined as follows:

$$OA = \sqrt{\frac{1}{2}[E_x^2 + E_y^2] + \sqrt{E_x^4 + E_y^4 + 2E_x^2 E_y^2 \cos(2\delta_L)}}$$

$$OB = \sqrt{\frac{1}{2}[E_x^2 + E_y^2] - \sqrt{E_x^4 + E_y^4 + 2E_x^2 E_y^2 \cos(2\delta_L)}}$$

$$AR = \frac{\text{Major axis}}{\text{Minor axis}} = \frac{OA}{OB}$$

$$\tau = \frac{1}{2}\arctan\left(\frac{2E_x E_y}{E_x^2 - E_y^2}\cos\delta_L\right) \pm \frac{\pi}{2}$$

The one or more antennas 102 can be any type of antenna capable of generating polarised electromagnetic radiation. For example, in some embodiments the one or more antennas 102 for transmitting polarised electromagnetic radiation comprise one or more patch antennas. As another example, in other embodiments the one or more antennas 102 may comprise a plurality of monopole antennas arranged on orthogonal axes. A patch antenna for generating polarised electromagnetic radiation is illustrated in FIG. 3, according to an embodiment of the present invention.

Figure 3:
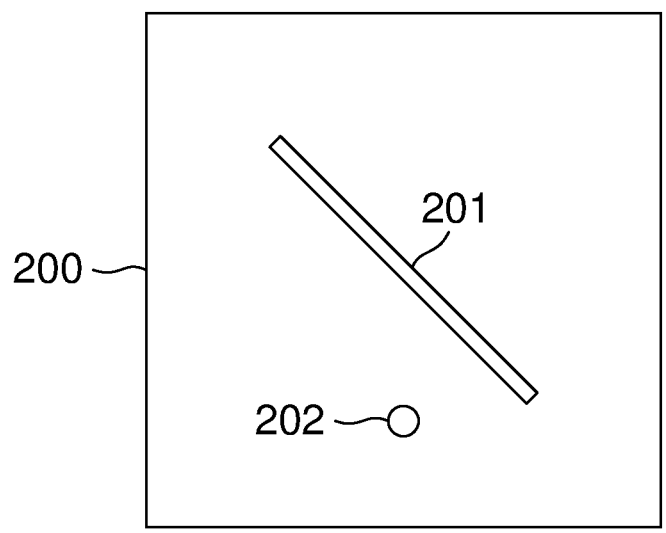
FIG. 3 illustrates a patch antenna for generating polarised electromagnetic radiation, according to an embodiment of the present invention.

In the embodiment shown in FIG. 3, the patch antenna 300 comprises an angled slot 301 for generating polarised electromagnetic radiation, and further comprises an antenna feed 302 for supplying power to the antenna 300 in the form of an electric current. The presence of the angled slot 301 causes the antenna 300 to emit elliptically polarised electromagnetic radiation, since the current density in the patch antenna has both X and Y components. Furthermore, studies by the inventors have demonstrated that the relative magnitudes of the X and Y components of the current are dependent on the length of the slot, and accordingly the axial ratio and tilt angle of the emitted elliptically-polarised electromagnetic radiation can be controlled by changing the dimensions of the slot.

Figure 4:
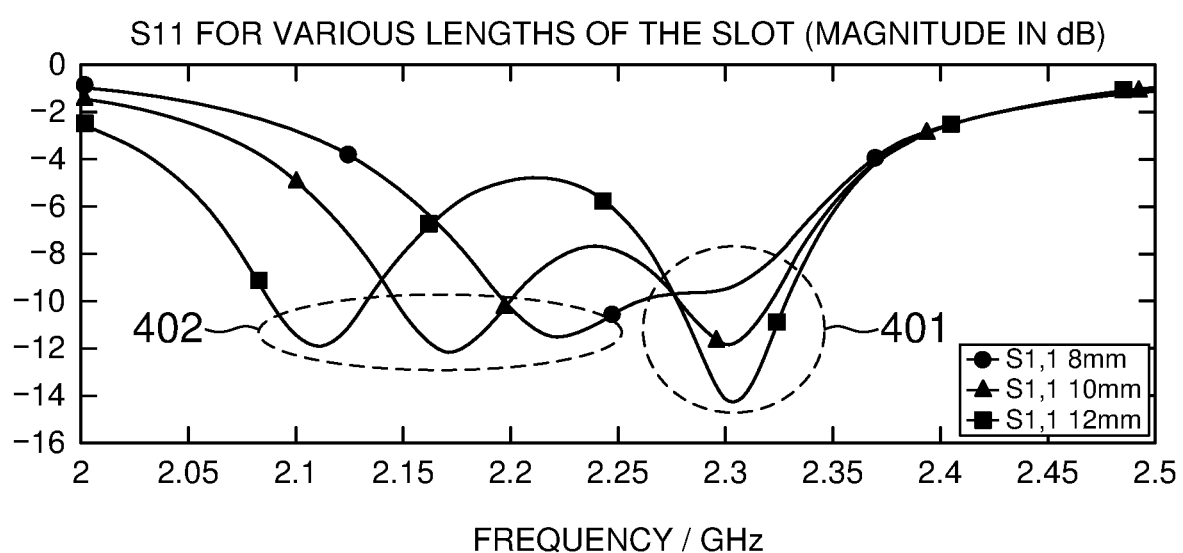
FIG. 4 is a graph illustrating the effect on the position of a resonant peak as a result of varying the electrical length of the angled slot in the patch antenna, according to an embodiment of the present invention.

Referring now to FIG. 4, a graph is illustrated showing the effect on the position of a resonant peak as a result of varying the electrical length of the angled slot in the patch antenna, according to an embodiment of the present invention. FIG. 4 illustrates simulation results for a patch antenna similar to the one shown in FIG. 3, with a thickness of 0.78 millimetres (mm), height and width of 30 mm, slot dimensions of 14×2 mm, and an antenna feed positioned 7 mm from the bottom edge of the patch. It will be understood that these dimensions are described merely by way of an example, and in other embodiments patch antennas having different dimensions may be used.

In FIG. 4, the Si reflection coefficient is plotted as a function of frequency in gigahertz (GHz) for different slot lengths in mm, while other system parameters are kept constant. The S11 value provides an indication of the antenna performance, and the operating frequencies of an antenna are typically considered to be those for which S11 is below –10 decibels (dB). As shown in FIG. 4, for a given slot length, there are two resonances in the plot of S11 versus frequency. For the embodiment shown in FIG. 4, the resonance peak 401 that occurs at around 2.3 GHz is independent of the slot length, and is hereinafter referred to as the 'stationary resonance'. The resonance peak 402 that occurs at a lower frequency is dependent on the slot length, and is hereinafter referred to as the 'moving resonance'. As shown in FIG. 4, increasing the slot length causes the resonant frequency of the moving resonance peak to decrease. As the slot length increases from 8 mm to 12 mm, the moving resonance is reduced from 2.4 GHz to 2.11 GHz while the stationary resonance remains at 2.3 GHz.

Further investigations by the inventors have revealed that the modes of the stationary and moving resonances are different, and as a result the contributions to the X and Y current components are different in the stationary resonance and moving resonance. By shifting the moving resonance further away from the stationary resonance, the effect on the stationary resonance can be reduced. The amount of combination of the moving and stationary resonances can be varied so as to control the axial ratio and tilt angle at the stationary resonance.

Consequently, in embodiments of the invention which use a patch antenna similar to the one shown in FIG. 3, the axial ratio and tilt angle of the polarisation ellipse of polarised radiation emitted by a patch antenna can be controlled by varying the length of an angled slot in the patch antenna. In some embodiments, instead of varying the physical length of the angled slot, means for adjusting the electrical length of the slot may be provided, allowing the axial ratio and tilt angle to be controlled by adjusting the electrical length of the slot. The electrical length may be adjusted on shorter timescales, enabling higher data rates when using the axial ratio and tilt angle of the polarisation ellipse to transmit data to a receiver.

Figure 5:
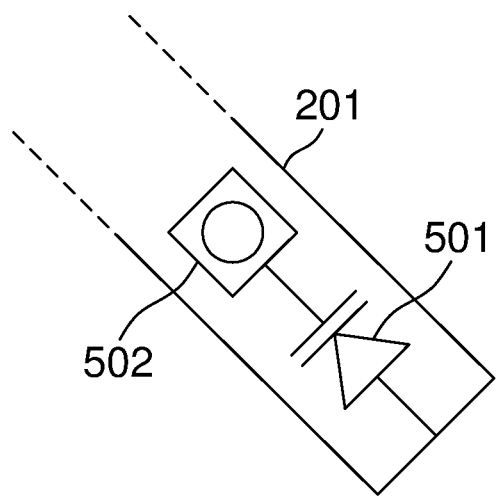
FIG. 5 illustrates a mechanism for varying the electrical length of the angled slot, according to an embodiment of the present invention.

FIG. 5 illustrates an example of a mechanism for varying the electrical length of the angled slot in a patch antenna, according to an embodiment of the present invention. The mechanism illustrated in FIG. 5, which is an example of means for varying the electrical length of the slot 201, comprises a variable capacitor (varactor) 501 disposed at or near one end of the angled slot 201. In some embodiments, a second varactor may also be disposed at or near the opposite end of the angled slot to allow a greater range of adjustment in the electrical length. In the present embodiment, one side of the varactor 501 is connected to the patch while the other is connected to ground using a via 502. Changing the voltage applied across the varactor diode 501 will change the capacitance of the varactor 501, and therefore the electrical size of the slot 201. Furthermore, changing the electrical length has a similar effect as changing the physical length of the slot 201. Therefore the influence of the controllable resonance on the stationary resonance can be adjusted by controlling the voltage across the varactor 501 to vary the capacitance of the varactor 501, and hence varying the electrical length of the slot 201.

Figure 6:
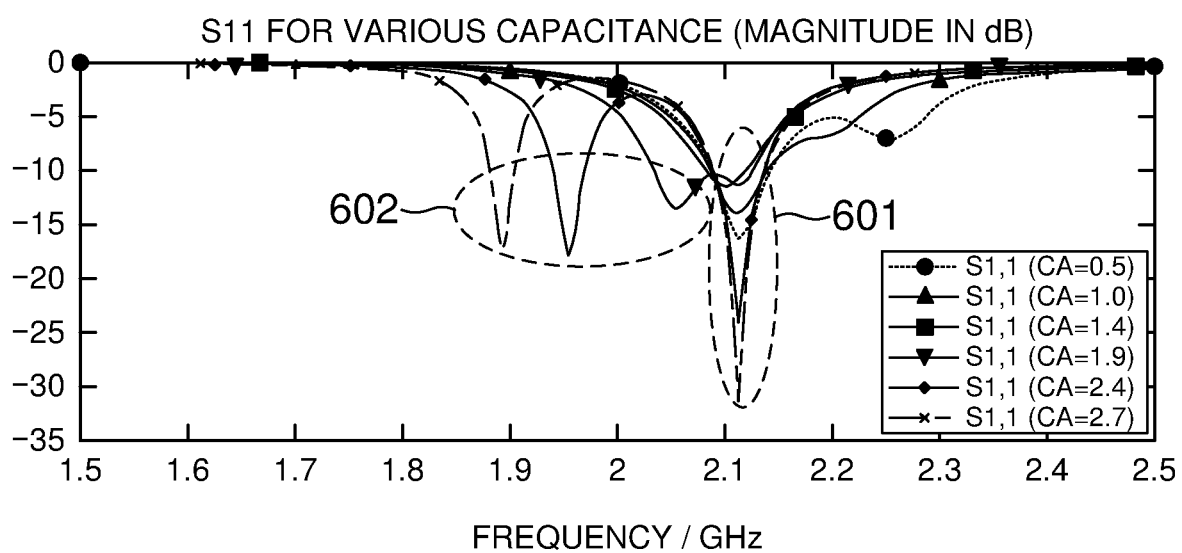
FIG. 6 is a graph illustrating the effect on the position of a resonant peak as a result of varying the capacitance of the varactor in the mechanism illustrated in FIG. 5, according to an embodiment of the present invention.

Referring now to FIG. 6, a graph is illustrated showing the effect on the position of a resonant peak as a result of varying the capacitance of the varactor in the mechanism illustrated in FIG. 5, according to an embodiment of the present invention. In FIG. 6, the S11 reflection coefficient is plotted as a function of frequency in GHz for different capacitance values of the varactor diode 501. As shown in FIG. 6, changing the capacitance from 0.5 picofarads (pF) to 2.7 pF causes the moving resonance 602 to decrease from 2.25 GHz to 1.9 GHz, while the stationary resonance 601 remains fixed at around 2.1 GHz. By comparing FIG. 4 and FIG. 6 it can be seen that changing the capacitance has a similar effect on the S11 reflection coefficient as changing the physical length.

Figure 7:
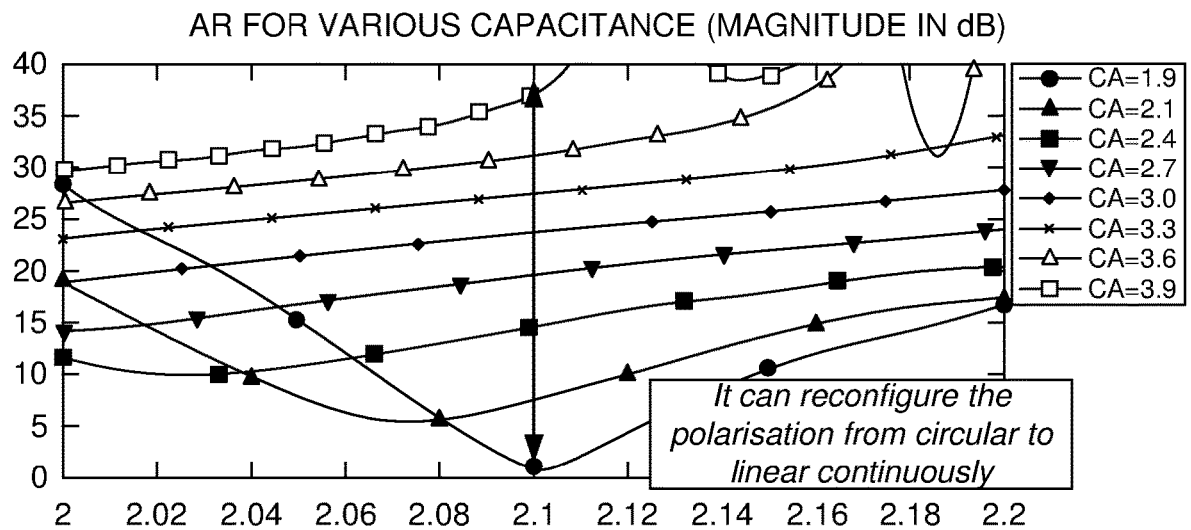
FIG. 7 is a graph illustrating the effect on the axial ratio as a result of varying the capacitance of the varactor in the mechanism illustrated in FIG. 5, according to an embodiment of the present invention.

As described above, the axial ratio and tilt angle can be controlled by adjusting the position of the moving resonance 402, 602 relative to the stationary resonance 401, 601. Referring now to FIG. 7, a graph is illustrated showing the effect on the axial ratio as a result of varying the capacitance of the varactor 501 in FIG. 5, according to an embodiment of the present invention. In FIG. 7, the axial ratio is plotted as a function of frequency in GHz for different capacitance values of the varactor diode 501. The simulation data plotted in FIG. 7 was obtained by monitored the axial ratio at the bore-sight and far-field of the antenna for different values of the capacitance. As shown in FIG. 7, the axial ratio at the frequency of the stationary resonance can be tuned in a continuous manner from 0 dB to 40 dB (elliptical polarisation) while the capacitance is changed from 1.9 pF to 3.9 pF. Accordingly, in a polarisation control mechanism such as the one shown in FIG. 5, the axial ratio can be controlled by changing the capacitance of the varactor.

Figure 8:
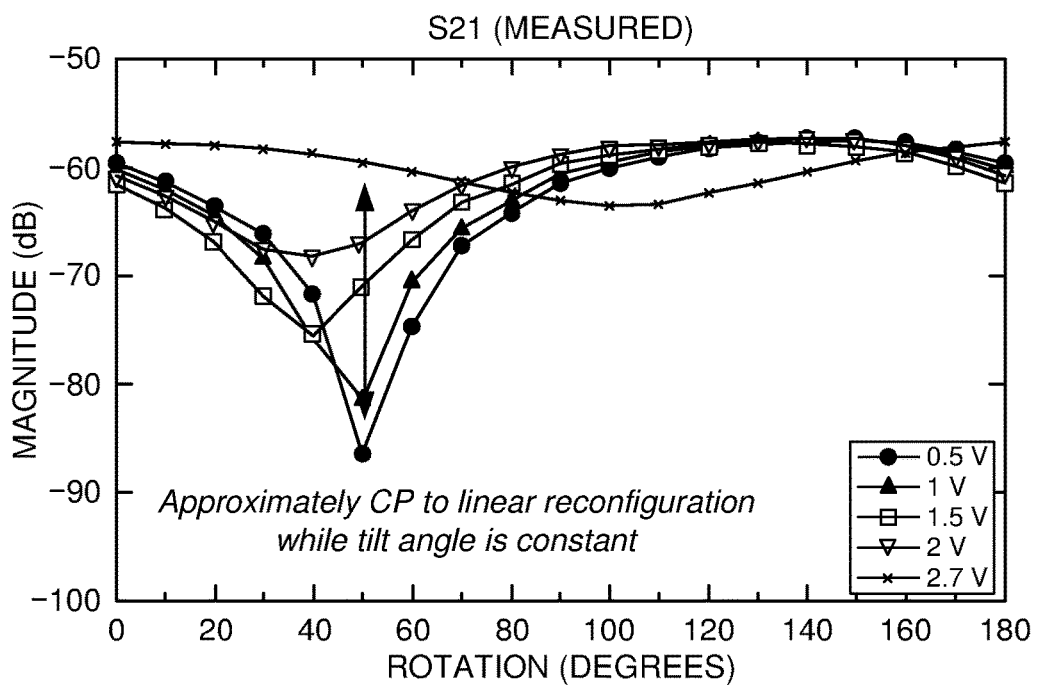
FIG. 8 is a graph illustrating measured data to show axial ratio tuning for various biasing voltages across the varactor, according to an embodiment of the present invention.
Figure 9:
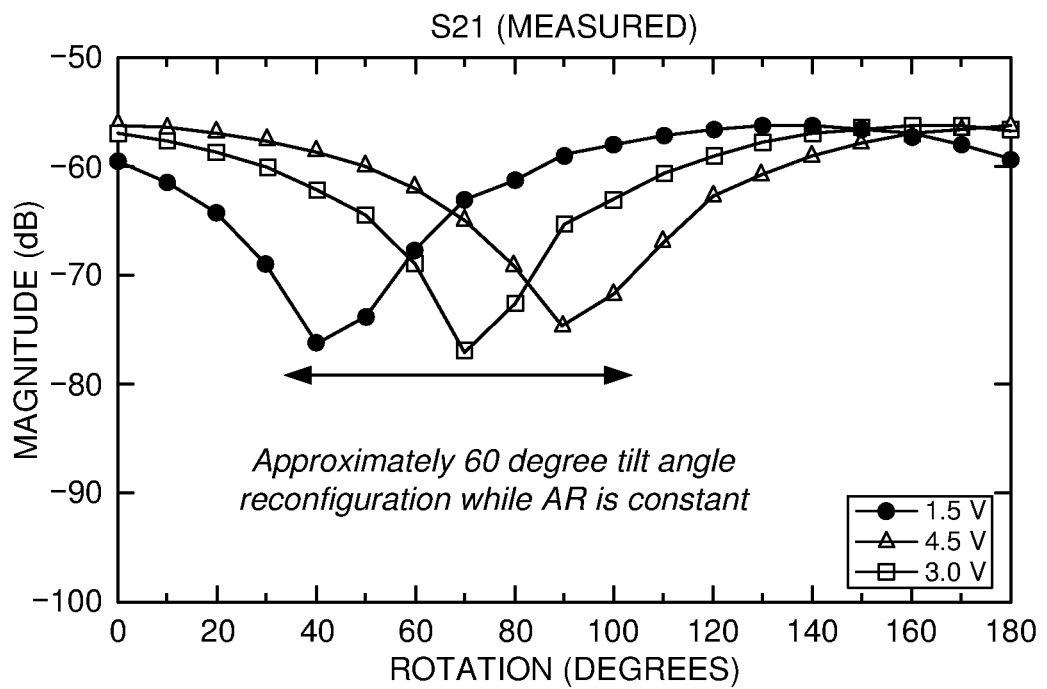
FIG. 9 is a graph illustrating measured data to show tilt angle tuning for various biasing voltages across the varactor, according to an embodiment of the present invention.

Referring now to FIGS. 8 and 9, graphs are illustrated to show axial ratio tuning and tilt angle tuning for various biasing voltages across the varactor 501 of FIG. 5, according to an embodiment of the present invention. FIGS. 8 and 9 illustrate experimental data obtained by measuring the axial ratio and tilt angle of elliptically polarised electromagnetic radiation emitted by a patch antenna with thickness of 1.7 mm, permittivity of 4.3, and loss tangent of 0.025. It will be understood that these parameters are described by way of example only, and should not be construed as limiting. To monitor the axial ratio and the tilt angle, the capacitance of the varactor is set, and the S21 is monitored while a reference antenna is rotated with a defined step angle. This process is repeated for other capacitance values. The tilt angle of minor and major axis are where the minimum and the maximum of S21 occurs, respectively. Therefore, the axial ratio would be the difference between the maximum and the minimum of the illustrated curves.

In FIGS. 8 and 9, the S21 is plotted as a function of reference antenna angle for various biasing voltages across the varactor 501. For the range of voltages plotted in FIG. 8, the difference between the minimum to maximum of the S21 varies from 1 dB to 38 dB, indicating that axial ratio tuning from linear to circular is achieved. At the same time, the rotation angle at which the minimum occurs remains approximately constant at around 50 degrees, showing that the tilt angle remains effectively unchanged while the axial ratio is tuned from linear to circular.

In FIG. 9, the S21 is plotted for three different voltages are applied across the varactor (1.5 V, 3 V and 4.5 V). For voltages of 1.5, 3 and 4.5 V, the minimum and maximum of the S21 is roughly the same, meaning that the axial ratio is almost the same for these voltages. However, the rotation angle at which the minimum occurs varies from about 40 degrees for 1.5 V to about 100 degrees for 4.5 V, demonstrating tilt angle tuning while the axial ratio remains constant.

Figure 10:
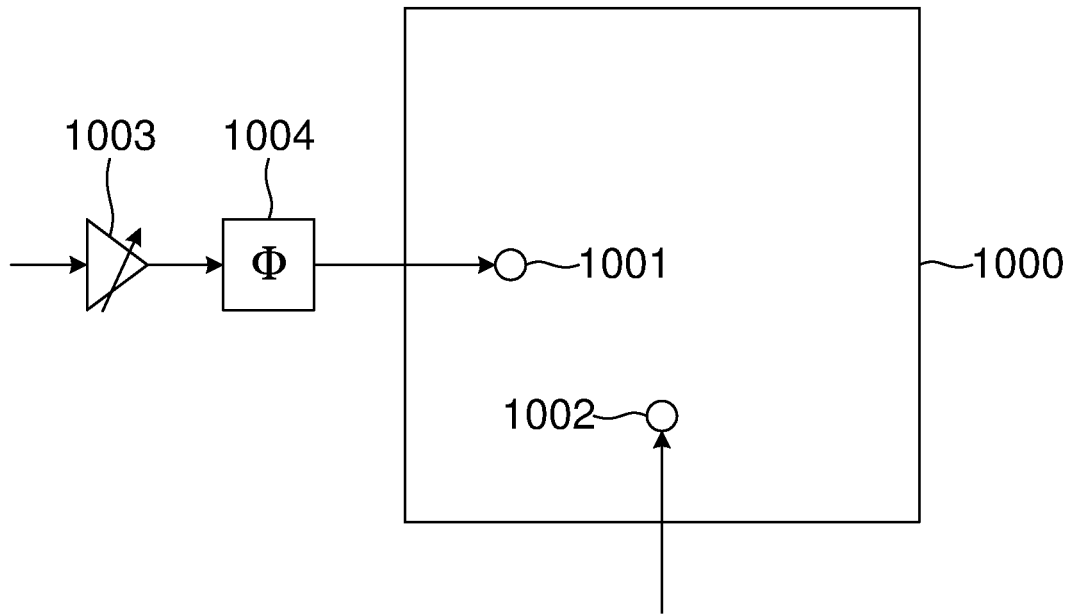
FIG. 10 illustrates a mechanism for tuning the tilt angle and axial ratio of polarised electromagnetic radiation, according to an embodiment of the present invention.

In the above-described embodiments, axial ratio and tilt angle tuning is achieved by changing the length of an angled slot in a patch antenna. Referring now to FIG. 10, an alternative mechanism for tuning the tilt angle and axial ratio of polarised electromagnetic radiation is illustrated, according to an embodiment of the present invention. In the embodiment shown in FIG. 10, a patch antenna 1000 comprises first 1001 and second 1002 antenna feeds arranged such that the antenna generates polarised electromagnetic radiation. In such embodiments, the polarisation control means can comprise phase and/or amplitude shifting means for varying a power and/or phase of a first input signal provided to the first antenna feed 1001, relative to a power and/or phase of a second input signal provided to the second antenna feed 1002. For example, the phase and/or amplitude shifting means may comprise a variable amplifier and/or a variable phase shifter. In the present embodiment the phase and/or amplitude shifting means comprises both a variable amplifier 1003 and a variable phase shifter 1004.

However, in other embodiments a different form of phase and/or amplitude shifting means may be used. For example, in some embodiments the phase and/or amplitude shifting means can comprise a plurality of switchable transmission lines for connecting the antenna feed to a signal source, and a switching unit configured to switch between the different transmission lines. For example, different ones of the plurality of transmission lines may have different physical lengths and/or thicknesses. Switching between transmission lines with different electrical lengths has the effect of applying a phase shift to the signal, and switching between transmission lines with different electrical resistances has the effect of applying an amplitude shift to the signal. This approach can provide a plurality of discrete amplitude and/or phase shift options, which can be selected by switching to an appropriate one of the transmission lines to connect the signal source to the antenna feed.

As a further alternative, in some embodiments the one or more antennas 102 may comprise a plurality of monopole antennas arranged on orthogonal axes. For example, a wireless data transmission apparatus may comprise three monopole antennas arranged on orthogonal axes. In such embodiments, the polarisation control means can be configured to control the relative phase and/or amplitude of input signals provided to different ones of the plurality of monopole antennas to control the tilt angle and axial ratio of elliptically polarised radiation transmitted by the arrangement of monopole antennas.

As described above, in embodiments of the present invention data may be transmitted in a wireless communication system by using the axial ratio and tilt angle of elliptically polarised electromagnetic radiation to convey information to a receiver. Examples of 4-state and 8-state 2-dimensional polarisation modulation (PM) schemes will now be described, according to embodiments of the present invention. The parameters for the 4-state PM scheme and the 8-state PM scheme are summarised respectively in Tables 1 and 2 below. The PM schemes illustrated in Tables 1 and 2 could be utilised with a transmitter design such as the one described above with reference to FIG. 5, which is capable of providing axial ratio tuning between 0 and 40 dB and tilt angle tuning between 40 to 100 degrees. The modulation schemes illustrated in Tables 1 and 2 are provided purely by way of example, and embodiments of the invention are not limited to these particular modulation schemes.

TABLE 1

2-dimensional, 4-state polarisation modulation constellation

| Bits | $E_x$ | $E_y$ | $\delta_L$ | $\tau$ | $AR_{Lin}$ | $AR_{dB}$ |
|---|---|---|---|---|---|---|
| [0 0] | 1 | 1.09 | 1.2° | 47° | 96 | 39.6 |
| [0 1] | 1 | 1.09 | 25° | 49° | 4.5 | 13 |
| [1 0] | 1 | 2.5 | 12° | 69.5° | 14 | 23 |
| [1 1] | 1 | 2.5 | 56° | 75° | 3.2 | 10 |

TABLE 2

2-dimensional, 8-state polarisation modulation constellation

| Bits | $E_x$ | $E_y$ | $\delta_L$ | $\tau$ | $AR_{Lin}$ | $AR_{dB}$ |
|---|---|---|---|---|---|---|
| [0 0 0] | 1 | 1.09 | 1.2° | 47° | 96 | 39.6 |
| [0 0 1] | 1 | 1.09 | 25° | 49° | 4.5 | 13 |
| [0 1 0] | 1 | 1.09 | 46° | 49° | 2.4 | 7.5 |
| [0 1 1] | 1 | 1.8 | 5° | 61° | 27 | 28.6 |
| [1 0 0] | 1 | 1.8 | 45° | 65° | 3 | 5.5 |
| [1 0 1] | 1 | 2.6 | 12° | 70.2° | 14.3 | 23.1 |
| [1 1 0] | 1 | 2.6 | 30° | 70° | 5.8 | 15.3 |
| [1 1 1] | 1 | 2.6 | 56° | 76° | 3.3 | 10.4 |

Figure 11:
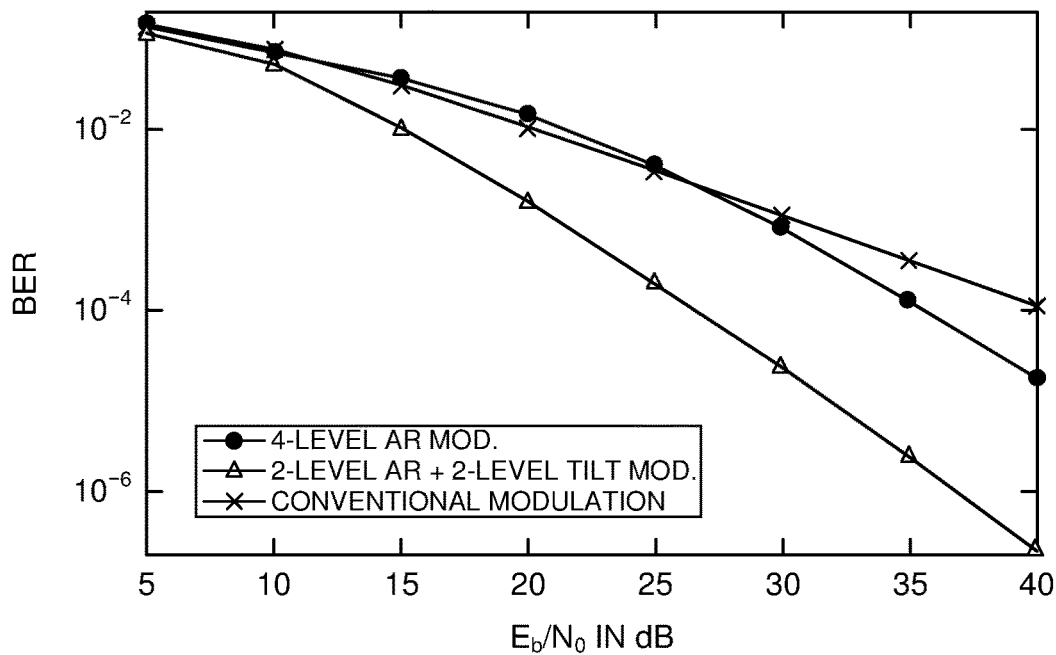
FIG. 11 is a graph comparing the performance of a 2D, 4-state polarisation modulation scheme to conventional modulation, according to an embodiment of the present invention.
Figure 12:
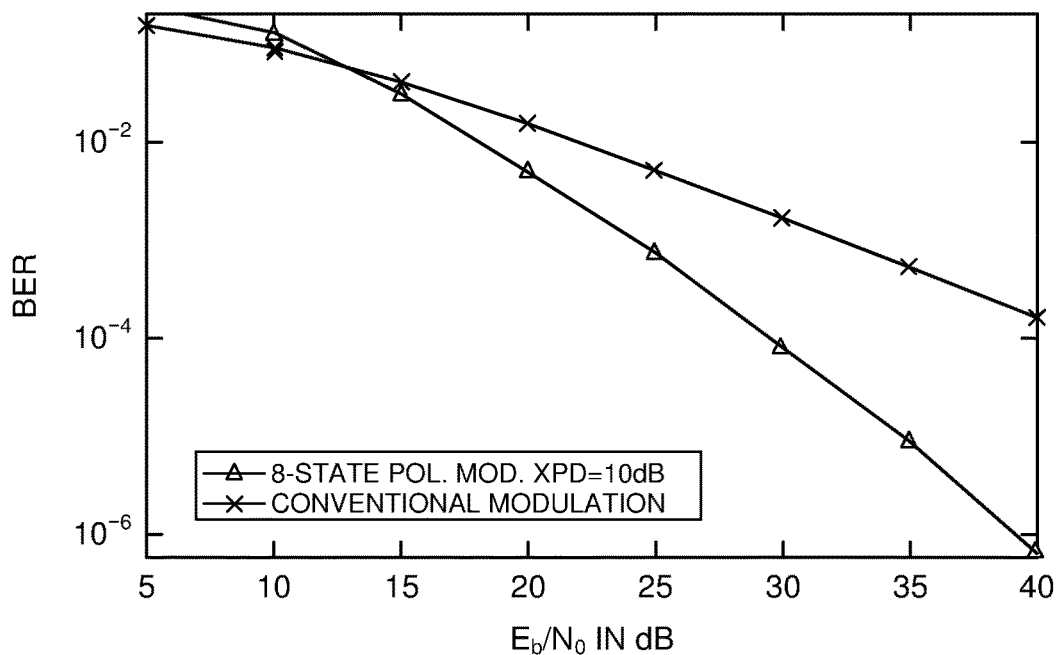
FIG. 12 is a graph comparing the performance of a 2D, 8-state polarisation modulation scheme to conventional modulation, according to an embodiment of the present invention.

For the PM schemes shown in Tables 1 and 2, simulation results comparing the performance of the 4-state and 8-state PM schemes to conventional modulation are plotted in FIGS. 11 and 12. FIG. 11 shows the simulation results for the 2D, 4-state PM scheme, and FIG. 12 shows the simulation results for the 2D, 8-state PM scheme. In FIG. 11, data for a conventional 64QAM modulation scheme carrying 6 bits per symbol is plotted by way of comparison. In FIG. 12, data for a conventional 128QAM modulation scheme carrying 7 bits per symbol is plotted by way of comparison. In the simulations used to obtain the data in FIGS. 11 and 12, the channel matrix is defined as:

$$H = \begin{bmatrix} h_{VV} & h_{VH} \\ h_{HV} & h_{HH} \end{bmatrix}$$

where $h_{VV}$ and $h_{HH}$ are co-polar channel coefficients and $h_{VH}$ and $H_{HV}$ are cross-polar components. The Cross-Polar Discrimination (XPD) is defined as:

$$XPD_H = \frac{E[h_{HH}^2]}{E[h_{VH}^2]}; XPD_V = \frac{E[h_{VV}^2]}{E[h_{HV}^2]}$$

and it is assumed that $XPD_H=XPD_V=XPD=10$ decibels (dB). Flat fading channels are assumed, and the co-polar components are normalized, i.e., $E[h_{HH}^2]=E[h_{VV}^2]=1$ As shown in FIGS. 11 and 12, a PM scheme utilising only AR tuning offers a slight performance increase in comparison to conventional modulation. However, a much greater performance increase is obtained using a 4-state PM scheme with 2-level AR and 2-level tilt angle modulation, or an 8-state PM scheme, both of which provide gains of around 14 dB in comparison to conventional modulation. Therefore in embodiments of the present invention, the spectrum efficiency of wireless communication systems can be significantly increased by utilising more DoFs in the form of the AR and tilt angle.

In some embodiments, the spectral efficiency may be further increased by utilising additional degrees of freedom (DoFs), for example by combining polarisation modulation schemes such as those illustrated in Tables 1 and 2 with conventional modulation schemes, such as QPSK and M-QAM. For example, when two separate QPSK signal streams are transmitted from both vertical and horizontal planes, four bits of information can be contained in the polarisation, while the remaining bits of information (2 bits in the case of 4-state PM; 3 bits in the case of 8-state PM) can be encoded within the phase/amplitude.

Accordingly, in some embodiments the polarisation control means may be configured to modulate first and second carrier waves, and the one or more antennas can be configured to transmit the first modulated carrier wave as electromagnetic radiation having a first polarisation direction and to transmit the second modulated carrier wave as electromagnetic radiation having a second polarisation direction orthogonal to the first polarisation direction, for example the horizontal and vertical directions. In such embodiments, the polarisation control means may be configured to modulate the first and second carrier waves with the same data, improving diversity. Alternatively, different data may be transmitted on the first and second carrier waves, increasing the data rate. For example, the data to be transmitted may comprise first data and second data, the second data being different to the first data, and the polarisation control means may be configured to modulate the first carrier wave with the first data and to modulate the second carrier wave with the second data. In embodiments in which I and Q modulation is used, each of the first and second carrier waves may comprise both cosine and sine waveforms, for the I and Q channels respectively, such that the first and second carrier waves both have I and Q components.

Figure 13:
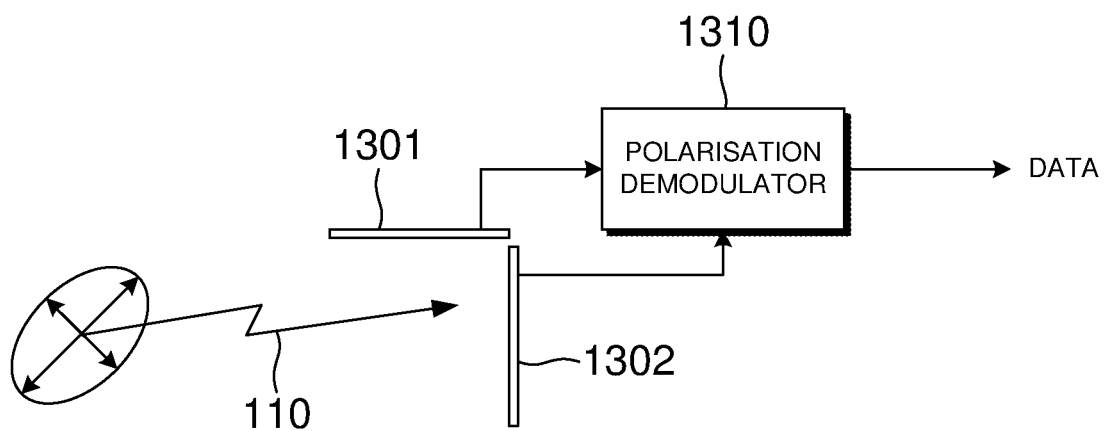
FIG. 13 illustrates a wireless data receiving apparatus, according to an embodiment of the present invention.

Referring now to FIG. 13, a wireless data receiving apparatus is illustrated according to an embodiment of the present invention. The wireless data receiving apparatus may receive data through a signal in the form of the elliptically polarised electromagnetic radiation generated by the wireless data transmission apparatus of FIG. 1. Together, the apparatus of FIG. 1 and the apparatus of FIG. 13 form a wireless data transmission system.

A wireless data receiving apparatus according to an embodiment of the present invention may comprise one or more antennas for receiving polarised electromagnetic radiation, means for determining an axial ratio and tilt angle of the received polarised electromagnetic radiation, and a data receiver configured to determine received data based on the determined axial ratio and tilt angle of the received polarised electromagnetic radiation.

In the present embodiment, illustrated in FIG. 13, the wireless data receiving apparatus comprises two orthogonal linear antennas 1301, 1302, such as dipole antenna. The orthogonal linear antennas 1301, 1302 can be used to detect the AR and tilt angle of the received elliptically polarised electromagnetic radiation 11o. The receiver comprises a polarisation demodulator 1310 configured to directly measure the amplitude and phase of the received signals at two orthogonal receivers, and determine values of the electric field in the x and y directions $E_x$, $E_y$. The polarisation demodulator 1310 can then determine the received AR and tilt angle from the determined $E_x$, $E_y$ using the equations described above.

The polarisation demodulator 1310 is further configured to perform demodulation using a lookup table arranged to store a plurality of combinations of tilt angles and ARs each associated with a different data symbol, in dependence on the current polarisation modulation scheme. For example, Table 1 or Table 2 as described above could be used as lookup tables at the receiver. In the present embodiment, the polarisation demodulator 1310 is configured to perform a maximum likelihood demodulation process by comparing different combinations of AR and tilt angle values from the lookup table to the received signal to and find the closest fit. The transmitted bits are then identified from the lookup table as the bit values associated with the combination of AR and tilt angle values that provides the closest fit to the signal observed at the receiver. As explained above, it should be understood that the modulation schemes illustrated in Tables 1 and 2 are provided purely by way of example, and embodiments of the invention are not limited to these particular modulation schemes. Furthermore, in other embodiments the polarisation demodulator 1310 may use a different method to determine the received data, other than maximum likelihood demodulation.

Figure 14:
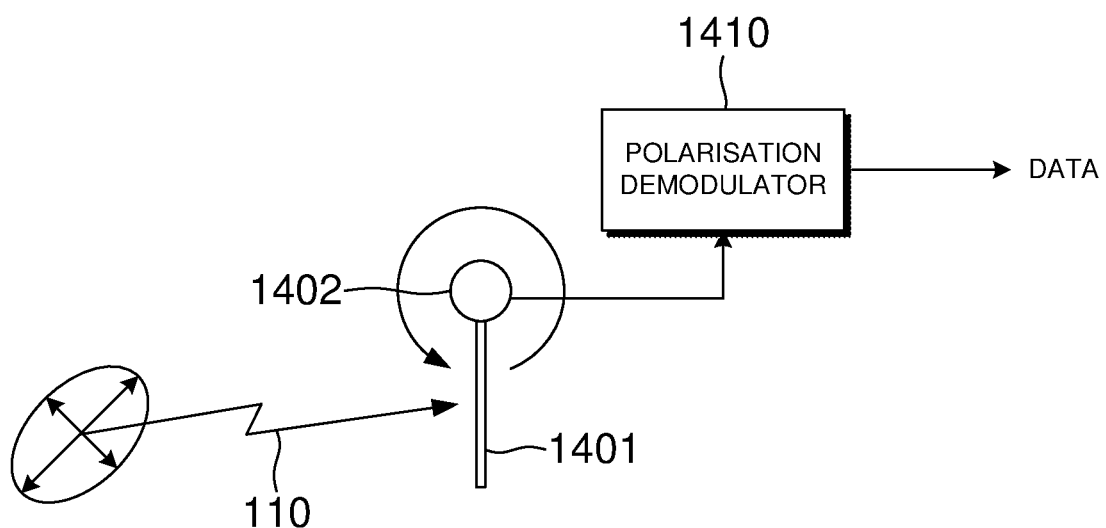
FIG. 14 illustrates a wireless data receiving apparatus comprising a rotatable linear antenna, according to an embodiment of the present invention.

In another embodiment, the receiver may be configured to rotate a linear antenna to sample the trajectory of the received signal. FIG. 14 illustrates a wireless data receiving apparatus comprising a rotatable linear antenna 1401 and a mechanism 1402 for rotating the linear antenna 1401, according to an embodiment of the present invention. If the received wave 110 is circular polarised, then as the antenna 1401 is rotated the measured power will remain constant. If the received wave 110 is elliptically polarised, at one rotation angle the signal will reach a maximum, enabling the polarisation demodulator 1410 to determine the major tilt angle. The minor axis 3 will be a direction orthogonal to the major axis, at which the received signal reaches a minimum. The polarisation demodulator 1410 can determine the AR as the difference between these two values in dB.

Figure 15:
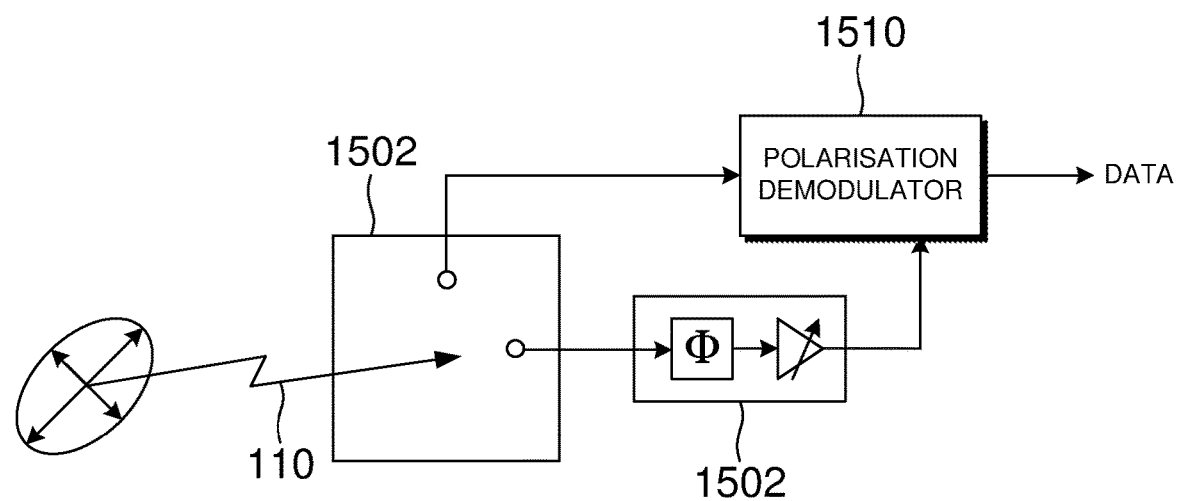
FIG. 15 illustrates a wireless data receiving apparatus comprising phase/amplitude shifting means for electrically rotating an antenna, according to an embodiment of the present invention.

In some embodiments, instead of physically rotating a linear antenna 1401, a receiver may electrically rotate an antenna using a mechanism similar to the one shown in FIG. 10 to apply a variable phase and/or amplitude shift to the received signal. FIG. 15 illustrates a wireless data receiving apparatus comprising a patch antenna 1501 with two antenna feeds, and phase/amplitude shifting means 1502 for applying a phase shift and/or an amplitude shift to a signal from one of the antenna feeds. In the present embodiment, the receiver can use the phase/amplitude shifting means 1502 to electrically rotate the antenna 1501 by varying the phase and/or amplitude of the signal from one antenna feed relative to the signal from the other antenna feed. Varying the phase and/or amplitude in this way has the effect of electrically rotating the antenna 1501. Similar to the embodiment of FIG. 14, the polarisation demodulator 1510 of the present embodiment can monitor the power received by the antenna 1501 while the phase/amplitude shifting means 1502 is controlled to electrically rotate the antenna, to identify the major and minor polarisation axes and hence determine the AR and tilt angle.

As a further alternative, in some embodiments a receiver may use multiple stationary linear antennas to sample the locus of the received wave. The number of antennas can be selected according to the required accuracy and the number of levels which are used for AR and tilt modulation in the PM scheme.

Figure 16:
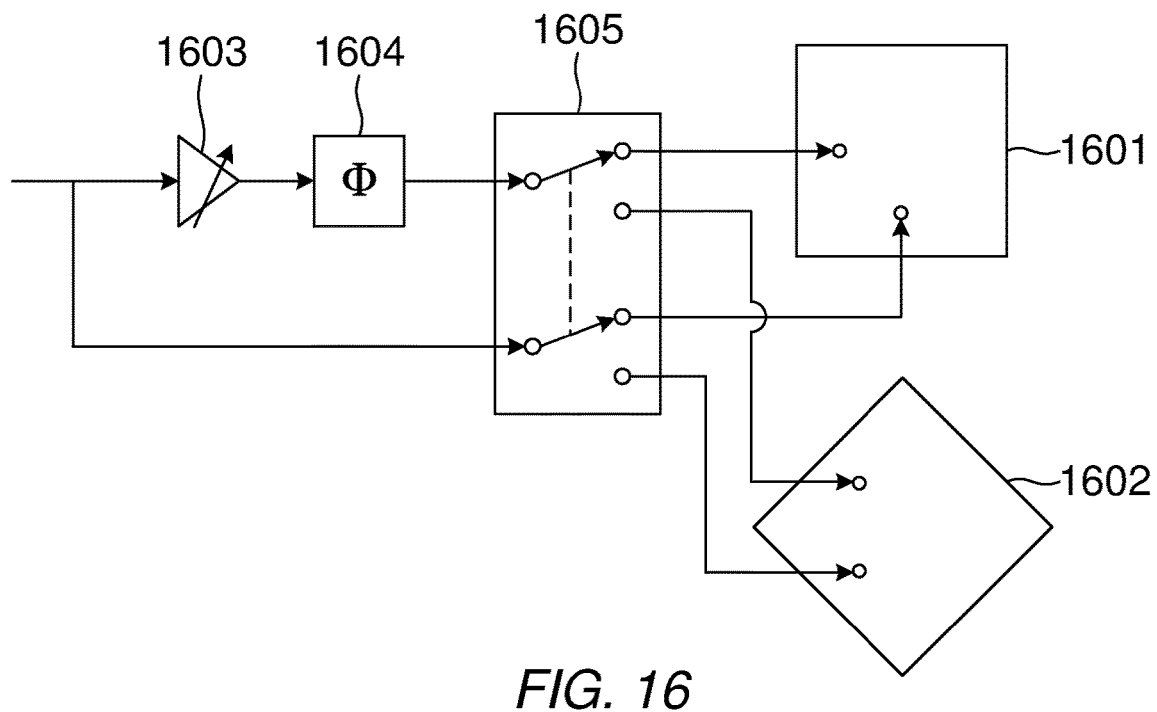
FIG. 16 illustrates a wireless data transmission apparatus comprising a plurality of antennas arranged in different orientations, according to an embodiment of the present invention.

Similarly, in some embodiments a wireless data transmission apparatus may use multiple stationary antennas to transmit signals with different polarisation tilt angles. Referring now to FIG. 16, a wireless data transmission apparatus comprising a plurality of antennas arranged in different orientations is illustrated, according to an embodiment of the present invention. Like the embodiment of FIG. 10, the apparatus of the present embodiment comprises a first patch antenna 1601 comprising first and second antenna feeds arranged such that the first antenna 1601 generates polarised electromagnetic radiation. Additionally, the apparatus comprising a second patch antenna 1602 comprising third and fourth antenna feeds arranged such that the second antenna 1602 generates polarised electromagnetic radiation.

For the sake of clarity only two antennas are illustrated in FIG. 16, but it will be appreciated that in other embodiments a wireless data transmission apparatus may comprise any number of antennas arranged in different orientations. Furthermore, in other embodiments a wireless data transmission apparatus similar to the one shown in FIG. 16 may comprise other types of antennas instead of patch antennas, for example in another embodiment a plurality of linear antennas arranged at different orientations may be used.

Since the first and second antennas 1601, 1602 are disposed at different orientations to one another, for any given input signal the first and second antennas 1601, 1602 will generate polarised electromagnetic radiation with different tilt angles. The apparatus of the present embodiment further comprises polarisation control means in the form of phase and/or amplitude shifting means 1603, 1604 and a switching unit 1605. As described previously with reference to FIG. 10, the phase and/or amplitude shifting means 1603, 1604 are configured to vary a power and/or phase of a first input signal relative to a power and/or phase of a second input signal. For example, the phase and/or amplitude shifting means may comprise a variable amplifier and/or a variable phase shifter. In the present embodiment the phase and/or amplitude shifting means comprises both a variable amplifier 1603 and a variable phase shifter 1604.

The switching unit is controllable to selectively direct an input signal to either the first antenna feed of the first antenna 1601 or to the third antenna feed of the second antenna 1602, and to selectively direct a phase and/or amplitude shifted signal to either the second antenna feed of the first antenna 1601 or to the fourth antenna feed of the second antenna 1602. By controlling the switching unit 1605 to switch between the first and second antennas 1601, 1602, the apparatus can change the tilt angle of the transmitted polarised electromagnetic radiation. The apparatus can also control the phase and/or amplitude shifting means 1603, 1604 so as to vary the axial ratio of the polarised electromagnetic radiation generated by either the first antenna 1601 or the second antenna 1602, and/or to apply a further adjustment to the tilt angle.

For example, in embodiments in which the phase and/or amplitude shifting means 1603, 1604 and the first antenna 1601 are only capable of adjusting the tilt angle within a certain limited range of values, providing one or more additional antennas 1602 at different orientations, combined with a switching unit 1605 for switching between different ones of the plurality of antennas 1601, 1602, a wider range of tilt angles can be achieved. This in turn enables the use of a greater number of combinations of tilt angles and/or axial ratios, allowing more bits to be transmitted and resulting in a higher spectral efficiency.

Whilst certain embodiments of the invention have been described herein with reference to the drawings, it will be understood that many variations and modifications will be possible without departing from the scope of the invention as defined in the accompanying claims.

The invention claimed is:

1. A wireless data transmission apparatus comprising:
   one or more antennas for transmitting data as polarised electromagnetic radiation; and
   polarisation control means for controlling an axial ratio and a tilt angle of the polarised electromagnetic radiation such that the axial ratio and tilt angle conveys information about the data being transmitted;
   wherein the polarisation control means is configured to apply in-phase I and quadrature Q modulation in addition to controlling the axial ratio and tilt angle of the polarised electromagnetic radiation, and
   wherein the polarisation control means is configured to apply the I and Q modulation and control the axial ratio and tilt angle according to a constellation mapping scheme comprising a plurality of symbols, wherein each one of the plurality of symbols is defined by a different combination of the axial ratio, tilt angle and I and Q values.

2. The wireless data transmission apparatus of claim 1, wherein the polarisation control means is configured to modulate first and second carrier waves, and the one or more antennas are configured to transmit the first modulated carrier wave as electromagnetic radiation having a first polarisation direction and to transmit the second modulated carrier wave as electromagnetic radiation having a second polarisation direction orthogonal to the first polarisation direction.

3. The wireless data transmission apparatus of claim 2, wherein the polarisation control means is configured to modulate the first and second carrier waves with the same data.

4. The wireless data transmission apparatus of claim 2, wherein the data to be transmitted comprises first data and second data, the second data being different to the first data, and wherein the polarisation control means is configured to modulate the first carrier wave with the first data and to modulate the second carrier wave with the second data.

5. The wireless data transmission apparatus of claim 1, wherein the one or more antennas comprises a patch antenna.

6. The wireless data transmission apparatus of claim 5, wherein the patch antenna comprises an angled slot for generating polarised electromagnetic radiation.

7. The wireless data transmission apparatus of claim 6, wherein the polarisation control means comprises:
    means for varying an electrical length of the angled slot; and
    a polarisation controller configured to control said means for varying the electrical length of the angled slot so as to control the axial ratio and tilt angle.

8. The wireless data transmission apparatus of claim 7, wherein the means for varying the electrical length of the angled slot comprises a variable capacitor disposed at or near one end of the angled slot.

9. The wireless data transmission apparatus of claim 5, wherein the patch antenna comprises first and second antenna feeds arranged to generate polarised electromagnetic radiation, and the polarisation control means is configured to vary a power and/or phase of a first input signal provided to the first antenna feed, relative to a power and/or phase of a second input signal provided to the second antenna feed.

10. The wireless data transmission apparatus of claim 1, wherein the polarisation control means is configured to control the polarisation of the electromagnetic radiation on three orthogonal polarisation axes.

11. The wireless data transmission apparatus of claim 1, wherein the one or more antennas comprises a plurality of antennas arranged at different orientations such that each one of the plurality of antennas is arranged to generate polarised electromagnetic radiation having a different tilt angle, the polarisation control means comprising:
    a switching unit configured to control the axial ratio by switching an antenna input signal between the plurality of antennas.

12. A wireless data transmission system comprising:
    wireless data transmission apparatus according to claim 1; and
    wireless data receiving apparatus, comprising:
        one or more antennas for receiving polarised electromagnetic radiation;
        means for determining an axial ratio and tilt angle of the received polarised electromagnetic radiation; and
        a data receiver configured to determine received data based on the determined axial ratio and tilt angle of the received polarised electromagnetic radiation;
    wherein the wireless data receiving apparatus is arranged to receive the polarised electromagnetic radiation transmitted by the wireless data transmission apparatus.

13. A wireless data receiving apparatus comprising:
    one or more antennas for receiving polarised electromagnetic radiation;
    means for determining an axial ratio and tilt angle of the received polarised electromagnetic radiation; and
    a data receiver configured to determine received data based on the determined axial ratio and tilt angle of the received polarised electromagnetic radiation;
    wherein the data receiver is configured to determine the received data according to a constellation mapping scheme comprising a plurality of symbols, wherein each one of the plurality of symbols is defined by a different combination of the axial ratio, tilt angle, and in-phase I and quadrature Q modulation values.

14. The wireless data receiving apparatus of claim 13, further comprising:
    an antenna rotation mechanism configured to electrically or physically rotate the one or more antennas,
    wherein the means for determining the axial ratio and tilt angle of the received polarised electromagnetic radiation is configured to monitor a power level of a signal received by the one or more antennas while the one or more antennas are rotated by the antenna rotation mechanism, and determine the axial ratio based on a difference between a minimum power level and a maximum power level detected while the one or more antennas are rotated.

15. The wireless data receiving apparatus of claim 14, wherein the one or more antennas comprise a linear antenna, and the antenna rotation mechanism comprises means for physically rotating the linear antenna.

16. The wireless data receiving apparatus of claim 14, wherein the one or more antennas comprise a patch antenna comprising first and second antenna feeds, and
    wherein the antenna rotation mechanism comprises means for applying a phase and/or amplitude shift to a signal received from one of the first and second antenna feeds relative to a signal received from the other one of the first and second antenna feeds, to electrically rotate the patch antenna.

17. The wireless data receiving apparatus of claim 13, wherein the one or more antennas comprise a plurality of linear antennas orientated at different angles, and
    wherein the means for determining the axial ratio and tilt angle of the received polarised electromagnetic radiation is configured to determine the axial ratio and tilt angle by comparing power levels of a plurality of signals detected by respective ones of the plurality of linear antennas.

* * * * *